US008424182B2

United States Patent
Sato et al.

(10) Patent No.: US 8,424,182 B2
(45) Date of Patent: Apr. 23, 2013

(54) FITTING DEVICE USING ROBOT

(75) Inventors: Takashi Sato, Minamitsuru-gun (JP);
Nobuaki Yamaoka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 141 days.

(21) Appl. No.: 13/014,758

(22) Filed: Jan. 27, 2011

(65) Prior Publication Data
US 2011/0225787 A1    Sep. 22, 2011

(30) Foreign Application Priority Data

Mar. 18, 2010  (JP) ................. 2010-062533

(51) Int. Cl.
*B23Q 17/00* (2006.01)
*B23P 19/00* (2006.01)

(52) U.S. Cl.
USPC ........................ 29/407.01; 29/705

(58) Field of Classification Search ............. 29/407.1, 29/407.09, 406, 407.01, 407.04, 407.05, 29/407.08, 428, 453, 525, 700, 705, 709, 29/712, 714, 721, 235, 281.1; 901/2, 31; 700/262, 247; 318/568.12
See application file for complete search history.

(56) References Cited

U.S. PATENT DOCUMENTS

| | | | |
|---|---|---|---|
| 3,984,006 A * | 10/1976 | Takeyasu et al. | 414/589 |
| 4,707,907 A * | 11/1987 | Ivanov | 29/525 |
| 7,177,722 B2 | 2/2007 | Kato et al. | |
| 2005/0113971 A1 | 5/2005 | Zhang et al. | |

FOREIGN PATENT DOCUMENTS

| EP | 2 002 945 A1 | 12/2008 |
|---|---|---|
| JP | 8-168927 | 7/1996 |
| JP | 9-258814 | 10/1997 |
| JP | 2004-167651 | 6/2004 |
| JP | 2008-264910 | 11/2008 |

* cited by examiner

*Primary Examiner* — John C Hong
(74) *Attorney, Agent, or Firm* — Drinker Biddle & Reath LLP

(57) ABSTRACT

A fitting device and a fitting method, by which the fitting process can be carried out without damaging workpieces, even when a sufficient moment cannot be detected by pressing the workpiece in the fitting direction. The device includes a fitting status judging part adapted to judge whether a second workpiece is in motion in a fitting direction relative to a first workpiece; a workpiece orientation searching part adapted to change a current orientation of the second workpiece when it is judged that the second workpiece is not in motion in the fitting direction, and search a proper orientation for the second workpiece based on a detected force or speed of the second workpiece in the fitting direction, during the change of the orientation; and a fitting motion commanding part adapted to command a robot which grips the second workpiece to continue the fitting operation, by using the searched proper orientation.

5 Claims, 7 Drawing Sheets

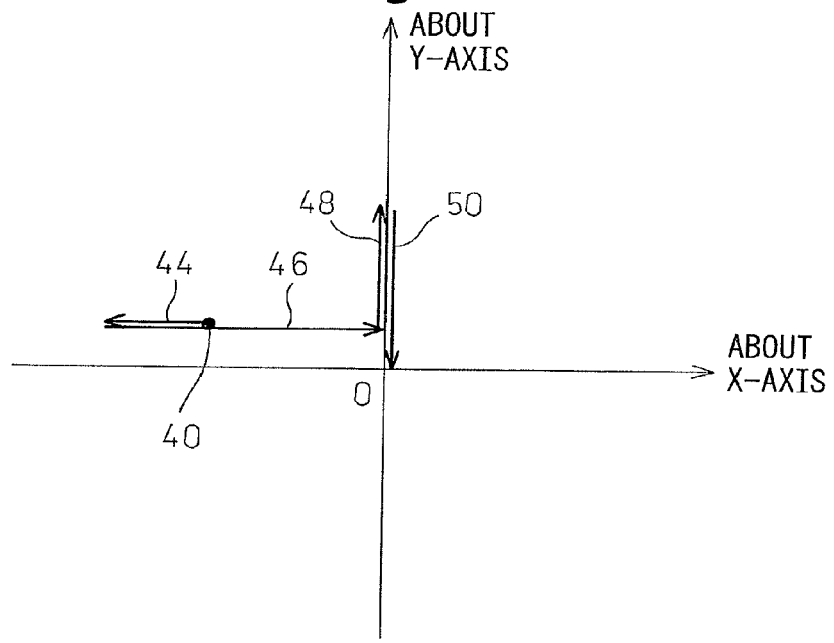
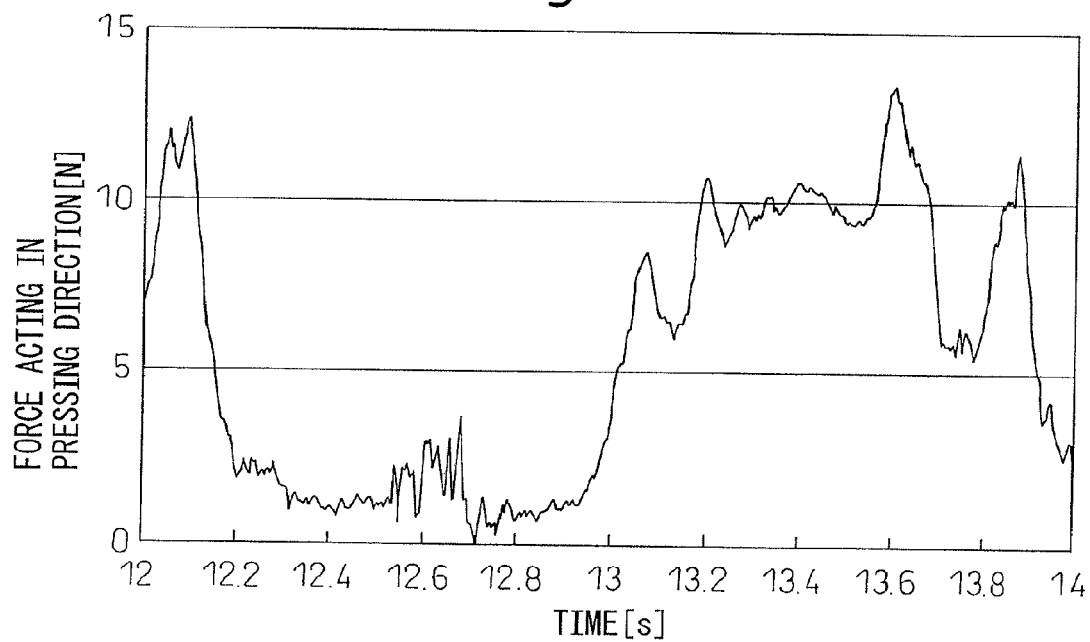

FORCE ACTING IN PRESSING DIRECTION [N]

DETECTED VALUE OF MOMENT [N·m]

POSITION OF ROBOT IN ADVANCING DIRECTION [mm]

POSTURE OF ROBOT [deg]

FITTING DEVICE USING ROBOT

RELATED APPLICATIONS

The present application claims priority from Japanese Patent Application No. 2010-62533, filed on Mar. 18, 2010, the entire contents of which are fully incorporated herein by reference.

BACKGROUND OF THE INVENTION

1. Field of the Invention

The present invention relates to a fitting device adapted to carry out a fitting process wherein, for example, a workpiece is inserted into a hole of an object.

2. Description of the Related Art

When a fitting process is carried out by using a fitting device having a robot and controlling force of the robot, an error in the orientation of a workpiece may be corrected by a procedure as shown in FIGS. 7 and 8. Concretely, as shown of part (a) of FIG. 8, for example, a cylindrical workpiece W2 is gripped by a robot and moved in a fitting direction D1, so as to fit W2 into a workpiece W1 having a fitting hole H1 corresponding to W2. First, after the workpieces contact each other, moment M due to the difference between the orientations of the workpieces is detected (step S101 of FIG. 7 and part (b) of FIG. 8). Then, the orientation of workpiece W2 is corrected due to the force control for the robot, so that moment M is reduced or close to zero (step S102 of FIG. 7 and part (c) of FIG. 8). Next, it is judged whether workpiece W2 is inserted into hole H1 of workpiece W1 by a predetermined length (step S103 of FIG. 7). If not, the procedure is returned to step S102. On the other hand, when workpiece W2 is inserted into hole H1 of workpiece W1 by the predetermined length (part (d) of FIG. 8), the fitting process is judged to be finished and the procedure is terminated (step S104 of FIG. 7).

Although the example of FIGS. 7 and 8 relates to the correction of the error in the orientation, the same is also applicable to the correction of an error in the position of the workpiece. In controlling the robot, command speed and command angular speed are calculated by multiplying the difference between a force or a moment applied to the both workpieces and a target force or a target moment by a parameter (force control gain). The detection of the force or moment, and calculation of the command speed and the command angular speed are performed with respect to each control period.

In addition to the above technique, Japanese Unexamined Patent Publication (Kokai) No. 8-168927 discloses a technique of detecting contact between a gripped workpiece and another workpiece into which the gripped workpiece should be inserted, and then reducing a gripping force against the workpiece. Then, a gripping part is moved in one plane so as to search a precise position of a hole and correct the position of the gripped workpiece, and the gripped workpiece is inserted into the hole after the gripping force is adjusted. Since the position of the hole is searched after the detection of the contact, the position of the hole may be precisely searched even when the position of the gripped workpiece is considerably different from the hole.

Japanese Unexamined Patent Publication (Kokai) No. 2004-167651 discloses a technique of searching an orientation component of a workpiece as well as a translation component. Even when it is difficult to detect a moment due to a large deviation of the orientation, a proper orientation of the workpiece may be searched by changing the orientation.

Further, Japanese Unexamined Patent Publication (Kokai) No. 2008-264910 discloses a robot control system adapted to add a vibration force, wherein the magnitude and direction thereof periodically vary, to a workpiece to be fitted, so as to avoid the jamming of the workpiece during the fitting process.

In a control method of the prior art, since a moment generated by an error in the orientation of a workpiece is relatively small, it is difficult to correct the orientation based on the moment. For example, as shown in part (b) of FIG. 8, moment M due to the error of the orientation of workpiece W2 is generated by a resultant force of forces F1 and F2 applied to workpiece W2. In this case, since the directions of F1 and F2 are appropriately opposed to each other, the resultant force is smaller than F1 or F2, and thus the moment generated by the resultant force is relatively small. Therefore, such a small moment may be insufficient to correct the orientation of the workpiece. In particular, the rigidity of the robot or the workpiece is low, it is difficult to detect the moment required to correct the orientation of the workpiece. On the other hand, it is possible to increase the moment by increasing the pressing force between the workpieces; however, the possibility of damage to the workpiece increases.

Japanese Unexamined Patent Publication (Kokai) No. 2004-167651 discloses one solution for the above problem. FIGS. 9a to 9d disclose an example of a searching operation disclosed in Japanese Unexamined Patent Publication (Kokai) No. 2004-167651. Concretely, FIGS. 9a to 9d indicate a position in a fitting direction (or the movement direction of the robot), a force applied to the workpiece in the fitting direction (or the pressing direction of the workpiece), an orientation of the robot about an axis, and a time variation of a detected moment, respectively. For simplification, only one component of the orientation is studied in this case. As shown in FIG. 9c, the orientation of the robot is repeatedly changed while the pressing operation. When the orientation is proper (in part L1 of FIG. 9a), the fitting of the workpiece progresses, on the other hand, when the orientation is not proper (in part L2 of FIG. 9a), the fitting of the workpiece does not progress. Accordingly, a technique is desired, by which the fitting process may be carried out in a short time and the frequency of the periodic application of the force as in FIG. 9b to the workpiece is reduced.

Similarly, in the technique of Japanese Unexamined Patent Publication (Kokai) No. 2008-264910, merely the reciprocating motion is carried out. Therefore, the fitting process may take a long time and excess force may be applied to the workpiece.

SUMMARY OF THE INVENTION

An object of the present invention is to provide a fitting device and a fitting method, by which the fitting process can be carried out without damaging the workpiece, even when a sufficient moment cannot be detected by pressing the workpiece in the fitting direction.

According to one aspect of the present invention, there is provided a fitting device adapted to fitting a second workpiece with a first workpiece located at a fixed position, by using a robot adapted to grip the second workpiece, the fitting device comprising: a force detecting part adapted to detect a force applied to the second workpiece; a fitting status judging part adapted to judge whether the second workpiece is in motion in a fitting direction relative to the first workpiece; a workpiece orientation searching part adapted to change a current orientation of the second workpiece when the fitting status judging part judges that the second workpiece is not in motion in the fitting direction relative to the first workpiece, and search a proper orientation for the second workpiece based on the force in the fitting direction detected by the force detecting part or a speed of the second workpiece in the fitting direction, during the change of the orientation of the second workpiece; and a fitting motion commanding part adapted to command the robot which grips the second workpiece to continue a fitting operation, by using the proper orientation of the second workpiece searched by the workpiece orientation searching part.

In a preferred embodiment, the workpiece orientation searching part changes the orientation of the second workpiece about at least one direction of two directions which are orthogonal to each other, each of the two directions being orthogonal to the fitting direction of the second workpiece.

In a preferred embodiment, the workpiece orientation searching part reciprocatingly changes the orientation of the second workpiece by a predetermined angle about a control point arranged in or on the second workpiece, and searches the proper orientation for the second workpiece based on the force in the fitting direction detected by the force detecting part or the speed of the second workpiece in the fitting direction, during the reciprocating change.

In a preferred embodiment, the workpiece orientation searching part judges that the orientation of the second workpiece is proper when the force in the fitting direction detected by the force detecting part falls below a predetermined threshold or when the speed of the second workpiece in the fitting direction exceeds a predetermined threshold, during the change of the orientation of the second workpiece.

In a preferred embodiment, the workpiece orientation searching part judges that the orientation of the second workpiece is proper at the time between when the force in the fitting direction detected by the force detecting part falls below a predetermined threshold or when the speed of the second workpiece in the fitting direction exceeds a predetermined threshold and when the force in the fitting direction detected by the force detecting part exceeds a predetermined threshold or when the speed of the second workpiece in the fitting direction falls below a predetermined threshold, during the change of the orientation of the second workpiece.

In a preferred embodiment, the force detecting part is adapted to detect a force and moment applied to the second workpiece, and the fitting device further comprises a force controlling part adapted to correct the orientation of the second workpiece by force control so as to reduce the moment.

In a preferred embodiment, the force detecting part is a six-axis force sensor.

According to another aspect of the present invention, there is provided a method for fitting a second workpiece with a first workpiece located at a fixed position, by using a robot adapted to grip the second workpiece, the method comprising the steps of: pressing the second workpiece against the first workpiece; detecting a force applied to the second workpiece; judging whether the second workpiece is in motion in a fitting direction relative to the first workpiece; changing a current orientation of the second workpiece when it is judged that the second workpiece is not in motion in the fitting direction relative to the first workpiece, and searching a proper orientation for the second workpiece based on the force in the fitting direction or a speed of the second workpiece in the fitting direction, during the change of the orientation of the second workpiece; and commanding the robot which grips the second workpiece to continue a fitting operation, by using the searched proper orientation of the second workpiece.

BRIEF DESCRIPTION OF THE DRAWINGS

The above and other objects, features and advantages of the present invention will be made more apparent by the following description of the preferred embodiments thereof with reference to the accompanying drawings wherein:

FIG. 5 is a diagram showing another example of an operation for searching a proper orientation of the fitting workpiece;

FIG. 6 is an enlarged partial diagram of FIG. 9b, and shows a graph indicating a time zone wherein the fitting workpiece represents the proper orientation;

DETAILED DESCRIPTION

Figure 1:
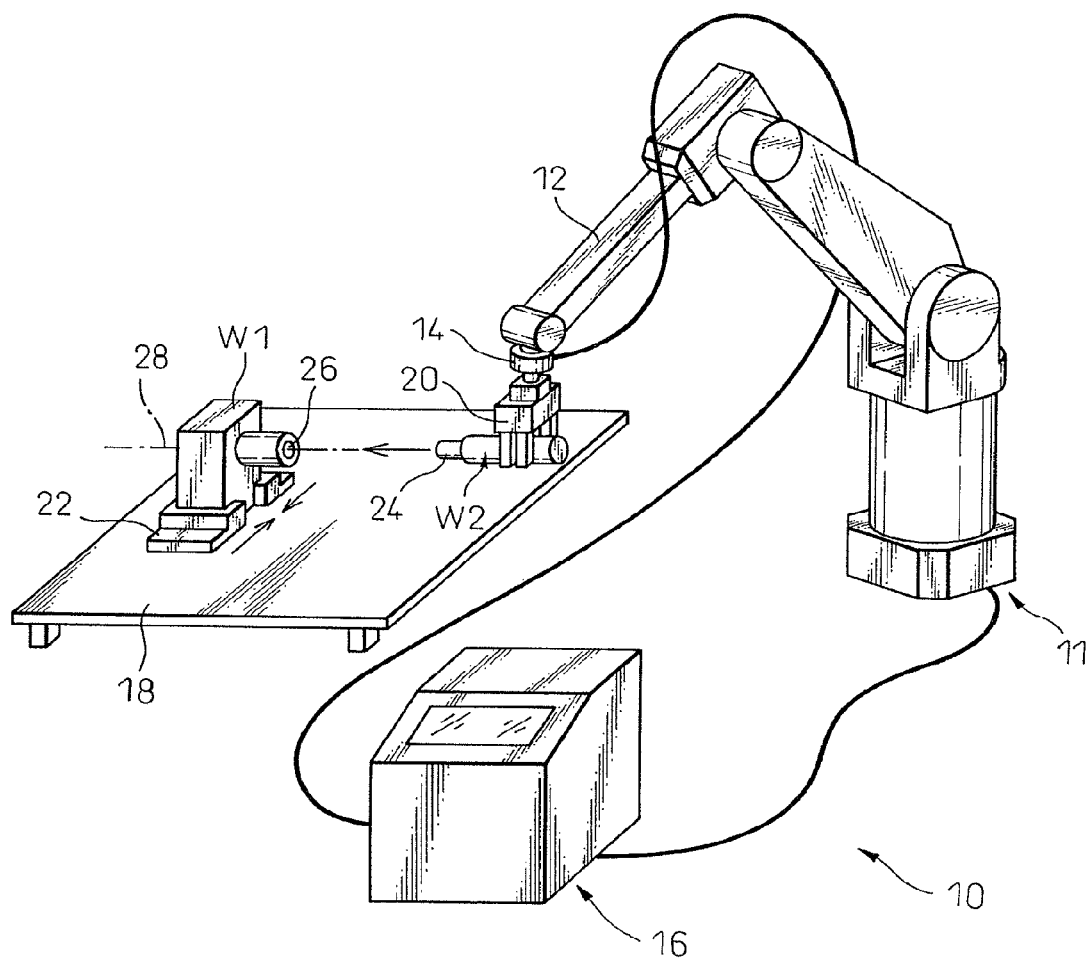
FIG. 1 shows a schematic configuration of a fitting device according to an embodiment of the invention.

Hereinafter, a preferred embodiment of the invention will be explained with reference to the drawings. FIG. 1 shows a schematic configuration of a fitting device 10 according to the present invention. Fitting device 10 includes a robot 11 having a robot arm 12 capable of rotating about a plurality of axes, a force detecting part or force detector 14 adapted to detect force and moment, a controller 16 adapted to control the motion of robot arm 12, and a table 18 to which a workpiece to be fitted or first workpiece W1. At the front end of robot arm 12, a hand 20, capable of gripping and releasing a fitting workpiece or second workpiece W2, is arranged. On table 18, a clamp device 22 adapted to fix workpiece W1 is arranged. Workpiece W1, to be fitted with workpiece W2 gripped by hand 20, may be detachably held by clamp device 20.

Force detector 14 is attached to a wrist part of robot arm 12, and adapted to detect force F and moment M applied to workpiece W2 gripped by hand 20. For example, force detector 14 is positioned between the front end of robot arm 12 and hand 20, and may be a six-axis force sensor adapted to detect the force in three axes orthogonal to each other and the moment about three axes orthogonal to each other. However, force detector 14 is not limited to the six-axis force sensor, and may have a configuration adapted to estimate the force and moment applied to workpiece W2 based on a current of an actuator such as a motor (not shown) for driving robot arm 12.

Workpiece W2 has a protruding portion 24 such as a cylindrical shape, and workpiece W1 has a fitting hole 26 corresponding to the shape of protruding portion 24. Due to such a configuration, workpieces W1 and W2 may be fitted with each other. In fitting device 10 as shown in FIG. 1, workpiece W2 having protruding portion 24 is gripped by hand 20, positioned so that protruding portion 24 is aligned with a center axis 28 of fitting hole 26 of workpiece W1 fixed to table 18, and then moved in a fitting direction parallel to center axis 28 so that protruding portion 24 of workpiece W2 is inserted into fitting hole 26 of workpiece W1 so as to fit the two workpieces with each other.

In this embodiment, a body of robot 11 and table 18 are fixed to the floor. An axis parallel to center axis of fitting hole 26 is referred to as Z-axis, and translational two axes orthogonal to each other, each of them being perpendicular to Z-axis, are referred to as X- and Y-axes. In addition, controller 16 functions as the fitting status judging part, the workpiece orientation searching part and the fitting motion commanding part of the invention, in the embodiment.

Figure 2:
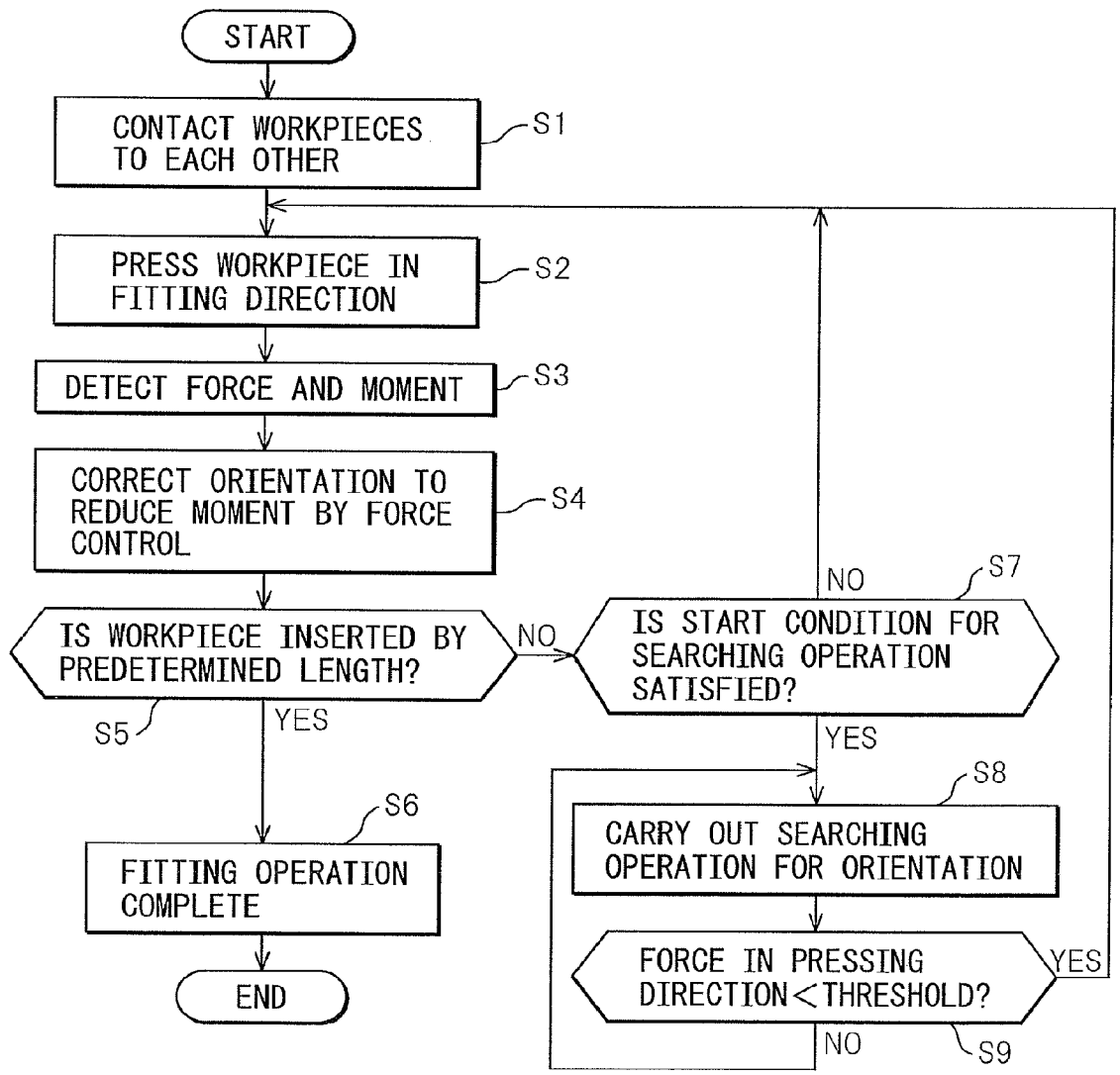
FIG. 2 is a flowchart indicating a fitting process of the invention.
Figure 7:
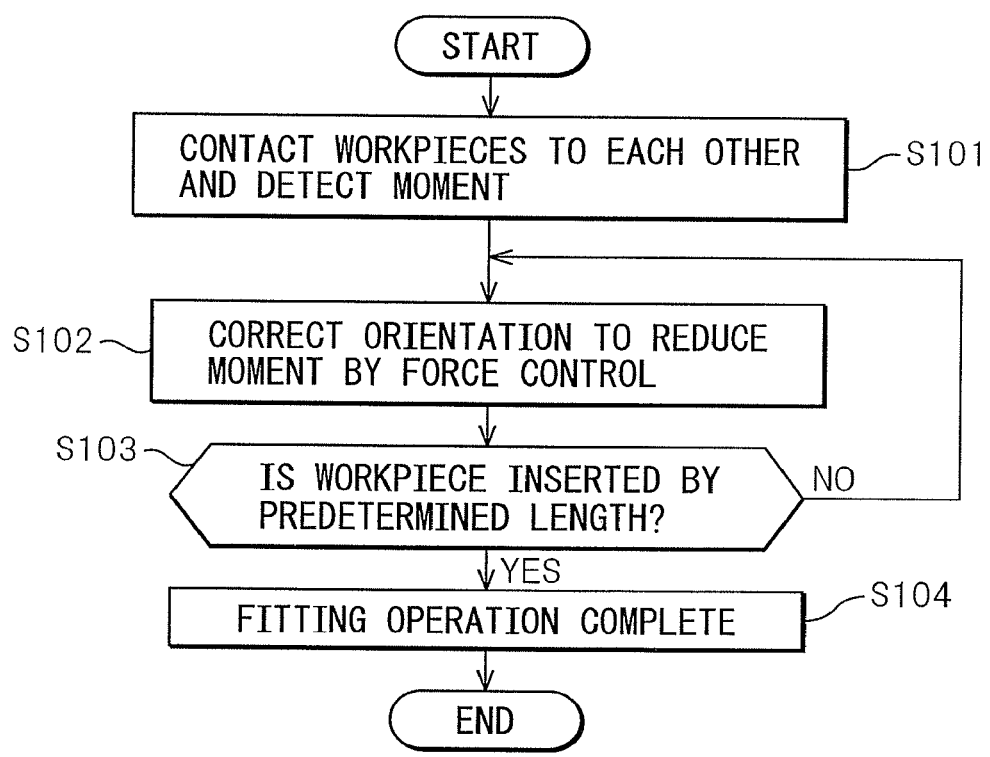
FIG. 7 is a flowchart indicating a fitting process of the prior art.

In the present invention, a proper orientation of the fitting workpiece, which is suitable for smoothly carrying out the fitting process as described below, may be judged. In other words, in the invention, the operation for searching the proper orientation is stopped when the proper orientation is obtained, and then the conventional force control, wherein the operation for searching the proper orientation, may be carried out (step S102 of FIG. 7). However, in the invention, since the proper orientation is obtained by the searching operation, it is not necessary to carry out the force control, and thus merely pushing operation of the workpiece may be carried out while maintaining the proper orientation of the workpiece. Hereinafter, the fitting process of the invention is explained with reference to the flow chart of FIG. 2.

First, in step S1, workpiece W2 contacts workpiece W1. Concretely, according to an operation command sent from controller 16 based on a predetermined program or the like, workpiece W2 is gripped by hand 20 attached to robot arm 12, and then, workpiece W2 is moved to a position opposed to workpiece W1 so that an axis of protruding portion 24 is aligned with center axis 28 of fitting hole 26 of workpiece W1 fixed to table 18. Then, robot arm 12 moves workpiece W2 in the fitting direction (or Z-direction) parallel to center axis 28 of fitting hole 26 of workpiece W1 so as to contact workpiece W2 to workpiece W1 on table 18.

Figure 3:
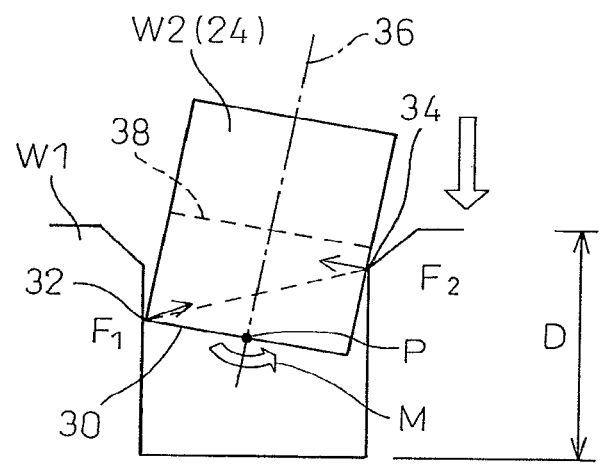
FIG. 3 is a diagram showing force and moment applied to a fitting workpiece due to an error of the orientation of the workpiece.

Since the position and the orientation of workpiece W2 usually have an error, in many cases, the fitting operation is carried out while center axis 28 of fitting hole 26 of workpiece W1 does not coincide with the axis of protruding portion 24 of workpiece W2 gripped by hand 20. In such a case, when workpiece W2 is pushed against workpiece W1 in the fitting direction (step S2), forces F1 and F2, and moment M are applied to workpiece W2 gripped by hand 20 (see FIG. 3). In detail, as shown in FIG. 3, the workpieces contact each other while axis 36 of protruding portion 24 of workpiece W2 is inclined relative to center axis 28 of fitting hole 26 of workpiece W1, force F1 generated at a contact point 32 between the workpieces, force F2 generated at a contact point 34 between the workpieces and moment M about an axis perpendicular to the fitting direction, are applied to workpiece W2.

In the next step S3, the forces and moment are detected by force detector 14. In detail, as shown in FIG. 3, forces F1 and F2 applied to workpiece W2 are detected, and then the moment about a control point P, which is set on workpiece W2, is detected or calculated based on the magnitudes of forces F1 and F2 and positions of the application points 32 and 34. Although control point P is determined at the center of an end surface (circular surface) in the fitting direction of cylindrical workpiece W2 in FIG. 3, this is a preferred embodiment and a non-limited example. It is preferable that the control point is set on or near center axis 36 of the fitting workpiece (if the workpiece is a prismatic or elliptic column, an axis extending through a center of gravity of an end surface thereof). Further, in order to calculate the moment about the control point, it is preferable that the control point is positioned near application points 32 and 34 of forces F1 and F2. For example, control point P may be positioned within a region defined by end surface 30 in the fitting direction of the workpiece and a boundary surface 38 parallel to end surface 30 and separated from end surface 30 by a distance corresponding to ½, ⅓ or ¼ of a fitting depth D, and further, control point P may be positioned on or near center axis 36 (if the workpiece is a prismatic or elliptic column, an axis extending through a center of gravity of an end surface thereof).

In the next step S4, based on the forces and moment detected by force detector 14, controller 16 controls the motion of robot arm 12 and hand 20 so that the detected forces and moment are close to target forces and a target moment (in other words, controller 16 carries out the force control).

Step S4 is explained in detail below. As described above, fitting workpiece W2 is pressed in the fitting direction (Z-direction), and a speed in each direction and an angular speed of the robot are controlled based on the force and moment applied to workpiece W2. Based on the following equations (1) to (5), the position of the control point is controlled.

$$v_X^D = F_X \times G_X \quad (1)$$

$$v_Y^D = F_Y \times G_Y \quad (2)$$

$$v_Z^D = (F_Z - F_d) \times G_Z + v_d \quad (3)$$

$$\omega_X^D = M_X \times G_W \quad (4)$$

$$\omega_Y^D = M_Y \times G_P \quad (5)$$

In this regard, left parts of equations (1) to (3) represent commanded speed value in X-, Y- and Z-directions, respectively, and left parts of equations (4) and (5) represent commanded angular speed value about X- and Y-axes, respectively. $F_X$, $F_Y$ and $F_Z$ represent forces in X-, Y- and Z-directions, respectively, and $M_X$ and $M_Y$ represent moments about X- and Y-axes, respectively. Further, $G_X$, $G_Y$, $G_Z$, $G_W$ and $G_P$ represent force control gains in X-, Y-, Z-, W- and P-directions, respectively, and $F_d$ and $v_d$ represent a target force and a target speed, respectively. These calculations are carried out in each calculation period.

As indicated by equations (1) to (5), the position and/or orientation may be corrected when a certain value of force or moment is detected. On the other hand, when the detected value is close to zero, it is difficult to properly correct the position and/or orientation. Therefore, by modifying equations (4) and (5), as in the following equations (6) and (7), respectively, a searching operation, including a moment command and an angular speed command which are not equal to zero, may be carried out.

$$\omega_X^D = (M_X - M_{Xd}) \times G_W + \omega_{Xd} \quad (6)$$

$$\omega_Y^D = (M_Y - M_{Yd}) \times G_P + \omega_{Yd} \quad (7)$$

In equations (6) and (7), $M_{Xd}$ and $M_{Yd}$ represent target moments about X- and Y-axes, respectively, and ($\omega_{Xd}$ and $\omega_{Yd}$ represent target angular speeds about X- and Y-axes, respectively. For the safety, it is preferable to inverse a sign (plus or minus) of the searching operation when one of following conditions i) and ii) is satisfied.

i) An amount of change in the orientation of the fitting workpiece at the control point exceeds an upper limit angle which is predetermined by a user.

ii) The moment applied to the fitting workpiece reaches a target moment which is predetermined by the user.

Figure 8:
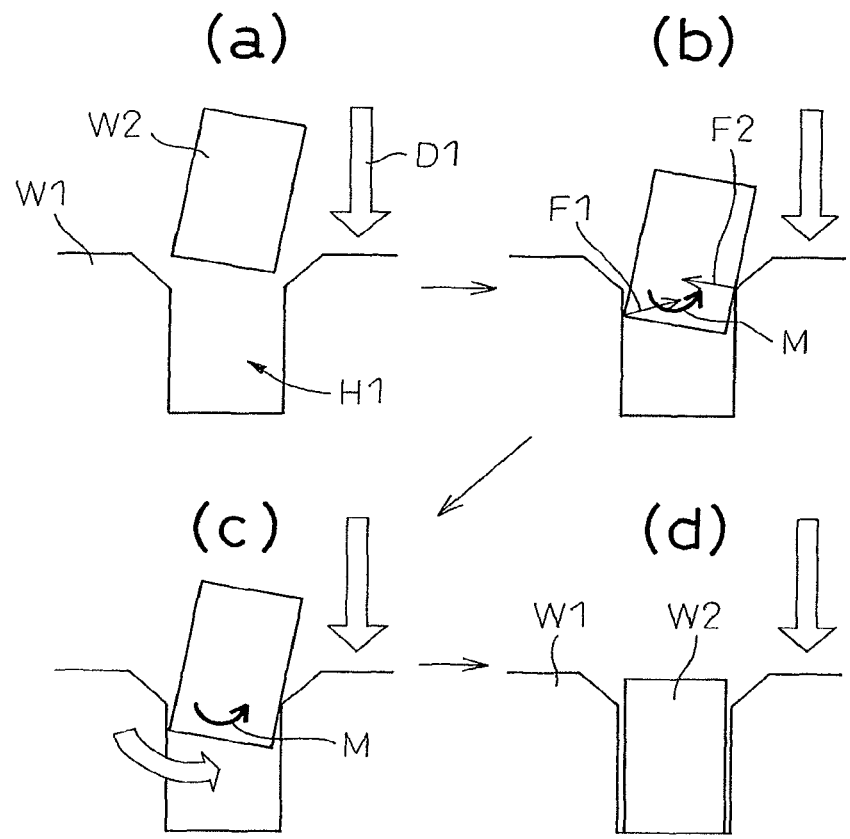
FIG. 8 is a diagram showing the positional relationship between the workpieces when the fitting process of FIG. 7 is carried out, part (a) showing a state wherein the fitting workpiece approaches a workpiece to be fitted, part (b) showing a state wherein the fitting workpiece contacts the workpiece to be fitted and the force and moment are generated due to an error of the orientation of the fitting workpiece, part (c) showing a state wherein force control is carried out so as to reduce the moment, and part (d) showing a state wherein the fitting process of the workpieces is completed.

Steps S1 to S4 may be carried out similarly to the prior art. Then, in the next step S5, it is judged whether workpiece W2 is inserted into workpiece W1 (as shown in part (d) of FIG. 8). If workpiece W2 is inserted by a predetermined length, the fitting operation is judged to be completed (step S6) and the process is terminated. If workpiece W2 is not inserted by the predetermined length yet, the process progresses to step S7. Depending on a result of Step S7, the operation for searching the orientation of the workpiece is carried out, and the searching operation is stopped when the proper orientation is obtained, followed by the force control.

In step S7, it is judged whether the orientation searching operation (step S8) as described below should be carried out. Concretely, at least one of following conditions (iii) to (v) can be selected as a criterion for judgment.

(iii) The workpieces contact each other for the first time, i.e., the following inequation (8) becomes true for the first time. In this regard, $C_F$ in inequation (8) represents a threshold of the force for judging the contact between the workpieces.

$$\sqrt{F_X^2+F_Y^2+F_Z^2} \geq C_F \qquad (8)$$

(iv) The fitting status judging part judges that workpiece W1 is in motion in the fitting direction relative to workpiece W2, i.e., at least one of the following inequations (9) to (14) becomes true.

$$|F_Z - F_d| \leq T_F \qquad (9)$$

$$|M_X| \leq T_M \qquad (10)$$

$$|M_Y| \leq T_M \qquad (11)$$

$$|v_Z| \leq T_v \qquad (12)$$

$$|\omega_X| \leq T_\omega \qquad (13)$$

$$|\omega_Y| \leq T_\omega \qquad (14)$$

In this regard, $T_F$ and $T_M$ represent thresholds for judging that the force and moment are close to the target values, respectively, and $T_v$ and $T_\omega$ represent thresholds for judging that workpiece W1 is not in motion in the fitting direction relative to workpiece W2. In addition, if it is difficult to judge whether workpiece W1 is in motion in the fitting direction relative to workpiece W2, due to a disturbance generated by vibration of the robot etc., a filtering process may be carried out in relation to the detected data of the force and moment, and the filtered data may be used for the judgment.

(v) The fitting depth (or the insertion length) of workpiece W1 relative to workpiece W2 does not reach a designated value within a period of time predetermined by the user. In this case, it may be judged that workpiece W1 is not in motion in the fitting direction relative to workpiece W2. For example, even while the orientation of the workpiece is corrected by the force control in step S4, the searching operation may be forcibly carried out if the fitting depth of workpiece W1 relative to workpiece W2 does not reach the designated value within the predetermined period of time.

Figure 4:
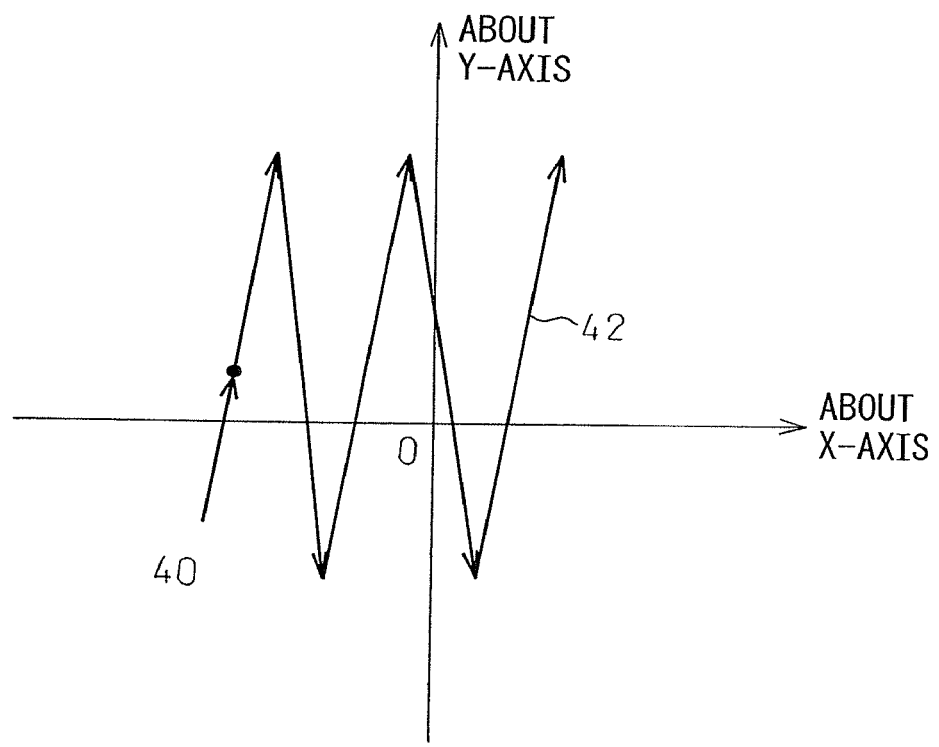
FIG. 4 is a diagram showing an example of an operation for searching a proper orientation of the fitting workpiece.

When it is judged that the searching operation should be carried out (or the fitting workpiece is not in motion in the fitting direction) in step S7, the process progresses to step S8 so as to carry out the searching operation. FIG. 4 shows an exemplified graph wherein the current orientation of the fitting workpiece is varied by applying the angular speed command to each of two components about X- and Y-axes. In FIG. 4, a point 40 represents the orientation of the fitting workpiece before the searching operation, and an origin O of the graph represents an ideal orientation of the workpiece for the fitting process. Horizontal and vertical axes of the graph represent the orientation (angle) of the fitting workpiece about X- and Y-axes, respectively. In this case, the orientation corresponding to a point on a graph 42, which is close to origin O, is determined to as the proper orientation.

FIG. 5 shows another example of the searching operation of FIG. 4. In the example of FIG. 5, in the searching operation, the two components about X- and Y-axes are not simultaneously changed, and each component is changed one-by-one. Concretely, the component about Y-axis is fixed and the component about X-axis is varied (as in graphs 44 and 46) so as to determine the optimum orientation about X-axis, and then, the component about X-axis is fixed and the component about Y-axis is varied (as in graphs 48 and 50) so as to determine the optimum orientation about Y-axis. However, the component about Y-axis may be firstly varied. As such, while the force control is carried out in relation to all of the components, and the proper orientation is searched by adding a moment command in relation to the component to be searched.

After the proper orientation is obtained by the searching operation in step S8, the force control is carried out again instead of the searching operation (step S9). For example, when the searching operation as shown in FIG. 5 is carried out, one of following conditions vi) to ix) is checked in relation to each component, and the process is returned to step S2 when one of the conditions is satisfied in relation to the two components.

vi) The force applied to the fitting workpiece in the fitting direction is equal to or smaller than a predetermined threshold.

vii) First, the orientation of the fitting workpiece or the robot, when the force in the fitting direction falls below a predetermined threshold, is recorded as a first orientation. Then, while the orientation of the workpiece or the robot is changed, the orientation of the fitting workpiece or the robot, when the force in the fitting direction exceeds the predetermined threshold, is recorded as a second orientation, and the change of the orientation is stopped. Next, the orientation of the workpiece or the robot is changed between the first and second orientation.

viii) The speed of the fitting workpiece in the fitting direction reaches a predetermined threshold.

ix) First, the orientation of the fitting workpiece or the robot, when the speed of the fitting workpiece in the fitting direction exceeds a predetermined threshold, is recorded as a third orientation. Then, while the orientation of the workpiece or the robot is changed, the orientation of the fitting workpiece or the robot, when the speed of the fitting workpiece in the fitting direction falls below the predetermined threshold, is recorded as a fourth orientation, and the change of the orientation is stopped. Next, the orientation of the workpiece or the robot is changed between the third and fourth orientations.

Figure 9B:
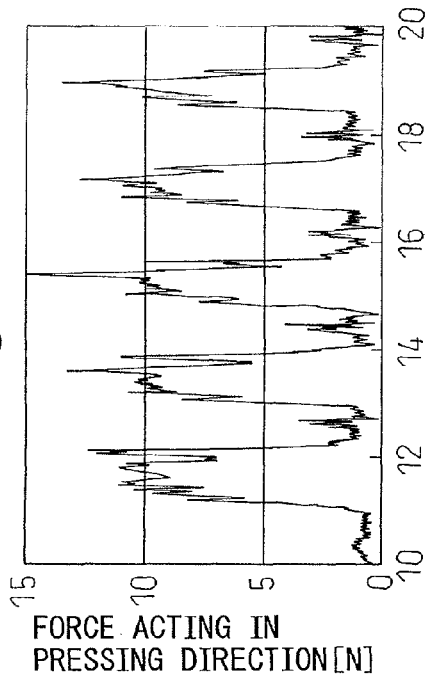
FIGS. 9a to 9d show a time change of each parameter when the fitting process of the prior art is carried out, FIG. 9a showing the position in a traveling direction of the robot (or the fitting workpiece), FIG. 9b showing a force applied to the fitting workpiece in a pressing direction, FIG. 9c showing the orientation of the robot (or the fitting workpiece) and FIG. 9d showing the moment applied to the fitting workpiece.
Figure 9D:
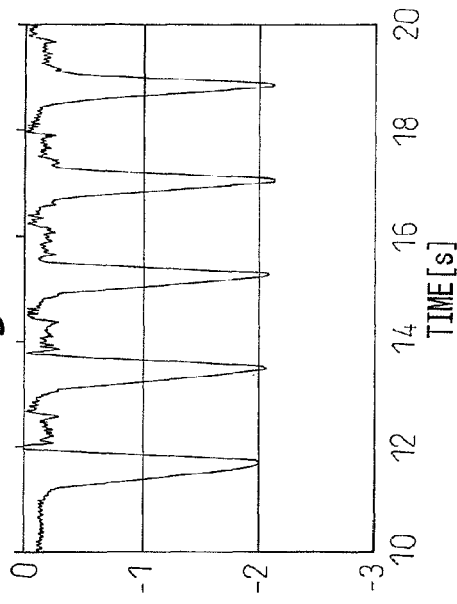
Figure 9A:
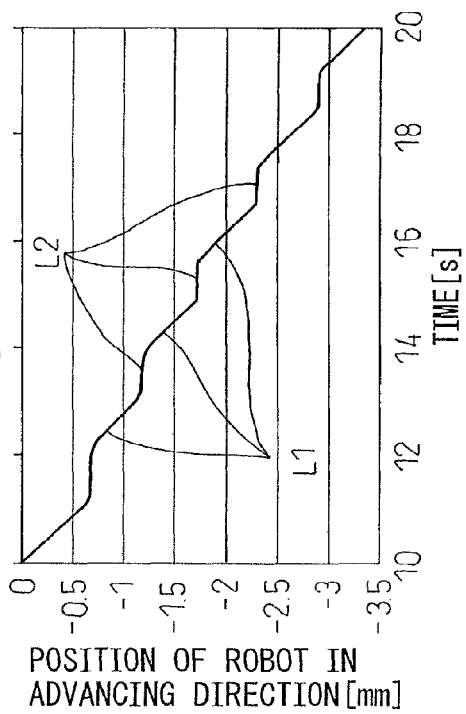
Figure 9C:
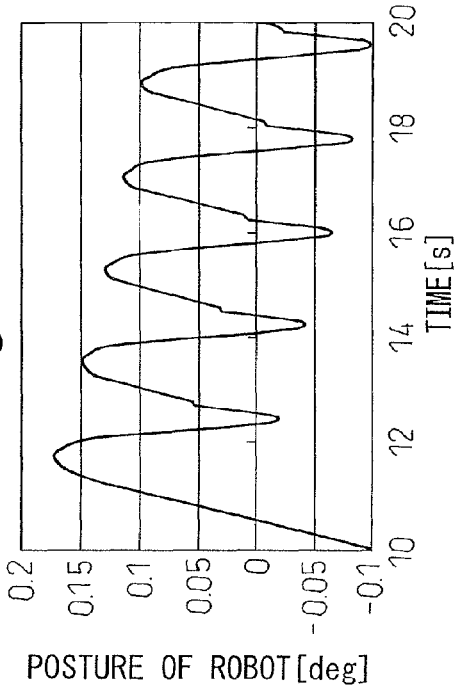

A concrete example regarding conditions vi) to ix) will be explained below. FIG. 6 is an enlarged view of FIG. 9b indicating a time change in the force, from 12 seconds to 14 seconds. As shown in FIG. 6, the force falls down between 12.2 seconds and 13.0 seconds (or significantly decreases relative to the other time zone). In other words, between 12.2 seconds and 13.0 seconds, the orientation of the fitting workpiece or the robot is assumed to be proper (or the fitting workpiece can be inserted into the fixed workpiece). Therefore, the searching operation is stopped when the force falls below a predetermined threshold (for example, 5N) (at 12.2 seconds), and the fitting operation may be continued while the orientation of the fitting workpiece or the robot is maintained at the orientation at 12.2 seconds (i.e., the proper orientation) (condition (vi)). Alternatively, at least between when the force falls below the threshold (at 12.2 seconds) and when the force exceeds the threshold again (at 13.0 seconds), the orientation is changed and the relationship between the orientation of the workpiece and each time is stored in a memory. Then, the fitting process is continued after the orientation of the workpiece or the robot is changed to the proper orientation, which corresponds to the orientation while the force is below the threshold (preferably, the orientation at 12.6 second (or intermediate time)) (condition (vii)). Due to this, a desired fitting process can be rapidly carried out, without applying excess force to the workpiece. In addition, although the above example with reference to FIG. 6 utilizes the change in the force, a similar concept is also applicable to a change in the speed (conditions (viii) and (ix)).

As the fitting process progresses, a time range wherein the force is lowered (from 12.2 seconds to 13.0 seconds in FIG. 5) is assumed to be gradually reduced. In other words, even when the proper orientation is determined by the above method after one searching operation and then the conventional force control is carried out, the fitting process may stop (i.e., the fitting workpiece cannot be inserted more deeply into the fixed workpiece). If the fitting process is not completed at that time, subject to satisfaction of one of the following conditions x) to xii), it is judged whether the searching operation should be carried out again. In addition, a threshold and a depth as in the following conditions may be experimentally determined.

x) The force in the fitting direction is equal to or larger than a threshold.

xi) The speed in the fitting direction is equal to or smaller than a threshold.

xii) The fitting workpiece is not inserted by a predetermined depth within a predetermined period of time.

The following inequations (15) and (16) are conditions for terminating the searching operation and carrying out the force control. When at least one of inequations (15) and (16) is true, it is judged that the orientation of the workpiece or the robot is proper.

$$F_Z \leq F_d \times R_F \quad (15)$$

$$v_Z \geq v_Z^D \times R_v \quad (16)$$

In formulas (15) and (16), each of $R_F$ and $R_V$ represents a constant determined by the user, which is smaller than one. For example, in the invention, the concrete searching operation may be selected from the following three options.

xiii) Searching operation in two directions at the same time

At least one of $M_{Xd}$ and $\omega_{Xd}$ in equation (6) is set to a value which is not zero, and at least one of $M_{Yd}$ and $\omega_{Yd}$ in equation (7) is set to a value which is not zero. Then, the searching operation is carried out in the two directions at the same time, and the force control is carried out instead of the searching operation when at least one of inequations (15) and (16) is satisfied.

xiv) Searching operation in each direction one-by-one

Both $M_{Yd}$ and $\omega_{Yd}$ in equation (7) are set to zero, and at least one of $M_{Xd}$ and $\omega_{Xd}$ in equation (6) is set to a value which is not zero, and then, the searching operation is carried out only about X-axis. When at least one of inequations (15) and (16) is satisfied, both $M_{Xd}$ and $\omega_{Xd}$ in equation (6) are set to zero, and at least one of $M_{Yd}$ and $\omega_{Yd}$ in equation (7) is set to a value which is not zero, and then, the searching operation is carried out only about Y-axis. Then, when at least one of inequations (15) and (16) is satisfied, the force control is carried out instead of the searching operation.

xv) Searching operation in each direction one-by-one, wherein the operation is stopped at the proper orientation Both $M_{Yd}$ and $\omega_{Yd}$ in equation (7) are set to zero, and at least one of $M_{Xd}$ and $\omega_{Xd}$ in equation (6) is set to a value which is not zero, and then, the searching operation is carried out only about X-axis. Orientation θ1 of the workpiece or the robot, when at least one of inequations (15) and (16) is firstly satisfied, is stored, and the searching operation is continued. Then, Orientation θ2 of the workpiece or the robot, when at least one of inequations (15) and (16) is not satisfied, is stored, and the searching operation is stopped. Next, the robot is operated so that the workpiece of the robot represents orientation θ as indicated in the following equation (17).

$$\theta = \frac{\theta_1 + \theta_2}{2} \quad (17)$$

After the robot is operated so that the workpiece of the robot represents orientation θ as indicated above, the searching operation is carried out only about Y-axis, similarly to about X-axis. Orientation θ1 of the workpiece or the robot, when at least one of inequations (15) and (16) is firstly satisfied, is stored, and the searching operation is continued. Then, Orientation θ2 of the workpiece or the robot, when at least one of inequations (15) and (16) is not satisfied, is stored, and the searching operation is stopped. Next, the robot is operated so that the workpiece of the robot represents orientation θ as indicated in the following equation (17), and then the force control is carried out instead of the searching operation.

According to the present invention, in the fitting process, the searching operation and the conventional force control may be alternatively used automatically. As a result, the fitting process is carried out more effectively.

According to the invention, an initial acceptable error of the orientation before the fitting process may be increased. Useless searching operation may be eliminated, whereby time required for the fitting may be reduced. Further, since the fitting process is carried out with the searched proper orientation, the fitting may be completed, even though the pressing force is relatively small and/or the rigidity of the robot or the workpiece is relatively low.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A fitting device adapted to fitting a second workpiece with a first workpiece located at a fixed position, by using a robot adapted to grip the second workpiece, the fitting device comprising:
   a force detecting part adapted to detect a force applied to the second workpiece;
   a fitting status judging part adapted to judge whether the second workpiece is in motion in a fitting direction relative to the first workpiece;
   a workpiece orientation searching part adapted to change a current orientation of the second workpiece when the fitting status judging part judges that the second workpiece is not in motion in the fitting direction relative to the first workpiece, and judge that the orientation of the second workpiece is proper at the time between when the force in the fitting direction detected by the force detecting part falls below a predetermined threshold or when the speed of the second workpiece in the fitting direction exceeds a predetermined threshold and when the force in the fitting direction detected by the force detecting part exceeds a predetermined threshold or when the speed of the second workpiece in the fitting direction falls below a predetermined threshold, during the change of the orientation of the second workpiece; and a fitting motion commanding part adapted to command the robot which grips the second workpiece to continue a fitting operation, by using the proper orientation of the second workpiece searched by the workpiece orientation searching part.

2. The fitting device as set forth in claim 1, wherein the workpiece orientation searching part changes the orientation of the second workpiece about at least one direction of two directions which are orthogonal to each other, each of the two directions being orthogonal to the fitting direction of the second workpiece.

3. The fitting device as set forth in claim 1, wherein the workpiece orientation searching part reciprocatingly changes the orientation of the second workpiece by a predetermined angle about a control point arranged in or on the second workpiece, and searches the proper orientation for the second workpiece based on the force in the fitting direction detected by the force detecting part or the speed of the second workpiece in the fitting direction, during the reciprocating change.

4. The fitting device as set forth in claim 1, wherein the force detecting part is adapted to detect a force and moment applied to the second workpiece, and the fitting device further comprises a force controlling part adapted to correct the orientation of the second workpiece by force control so as to reduce the moment.

5. A method for fitting a second workpiece with a first workpiece located at a fixed position, by using a robot adapted to grip the second workpiece, the method comprising the steps of:

pressing the second workpiece against the first workpiece;

detecting a force applied to the second workpiece;

judging whether the second workpiece is in motion in a fitting direction relative to the first workpiece;

changing a current orientation of the second workpiece when it is judged that the second workpiece is not in motion in the fitting direction relative to the first workpiece, and judging that the orientation of the second workpiece is proper at the time between when the force in the fitting direction detected by a force detecting part falls below a predetermined threshold or when the speed of the second workpiece in the fitting direction exceeds a predetermined threshold and when the force in the fitting direction detected by the force detecting part exceeds a predetermined threshold or when the speed of the second workpiece in the fitting direction falls below a predetermined threshold, during the change of the orientation of the second workpiece; and commanding the robot which grips the second workpiece to continue a fitting operation, by using a searched proper orientation of the second workpiece.

* * * * *